United States Patent [19]

Chen

[11] Patent Number: 4,670,869
[45] Date of Patent: Jun. 2, 1987

[54] SWITCHING LASER BEAM APPARATUS WITH RECOMBINED BEAM FOR RECORDING

[75] Inventor: Di Chen, Colorado Springs, Colo.

[73] Assignee: Magnetic Peripherals Inc., Minneapolis, Minn.

[21] Appl. No.: 567,610

[22] Filed: Jan. 3, 1984

[51] Int. Cl.[4] .......................... G11B 7/00; G02F 1/33
[52] U.S. Cl. .................................... 369/109; 369/44; 369/45; 350/358
[58] Field of Search .................... 369/43–46, 369/54, 58, 104–112, 32, 33, 41, 116, 120; 358/342; 346/108, 76 L; 350/358, 486

[56] References Cited

U.S. PATENT DOCUMENTS

| | | | |
|---|---|---|---|
| 3,962,688 | 6/1976 | Westerberg | 369/32 |
| 3,983,317 | 9/1976 | Gloriogo | 369/112 |
| 4,201,455 | 5/1980 | Vadasz et al. | 350/358 |
| 4,241,246 | 12/1980 | Shigematsu et al. | 358/342 |
| 4,308,612 | 12/1981 | Miyauchi et al. | 369/58 |
| 4,355,318 | 10/1982 | Miyanchi | 346/36 L |
| 4,357,627 | 11/1982 | Johnson | 358/348 |
| 4,447,134 | 5/1984 | Rosenheck | 350/358 |
| 4,449,212 | 5/1984 | Reno | 369/44 |
| 4,459,690 | 7/1984 | Covsover et al. | 369/44 |
| 4,462,095 | 7/1984 | Chen | 369/44 |
| 4,530,573 | 7/1985 | Wolkstein | 350/358 |
| 4,549,288 | 10/1985 | Chan | 369/54 |
| 4,556,965 | 12/1985 | Tsunoda et al. | 369/112 |

Primary Examiner—Raymond F. Cardillo
Assistant Examiner—Steven R. Garland
Attorney, Agent, or Firm—J. A. Genovese; E. P. Heller, III

[57] ABSTRACT

A gas laser optical recording apparatus having a write beam deflected from the optical path taken by the read beams by an acoustic optical modulator. In one embodiment the write beam is time-shared between the read optical path and the write optical path. In this embodiment an attenuator is placed in the read optical path to reduce the power of the laser beam from write power to read power. In a second embodiment 5 percent of the power is allowed to remain in the read optical path and the write beam is deflected between a beam stop and the write optical path as required.

2 Claims, 6 Drawing Figures

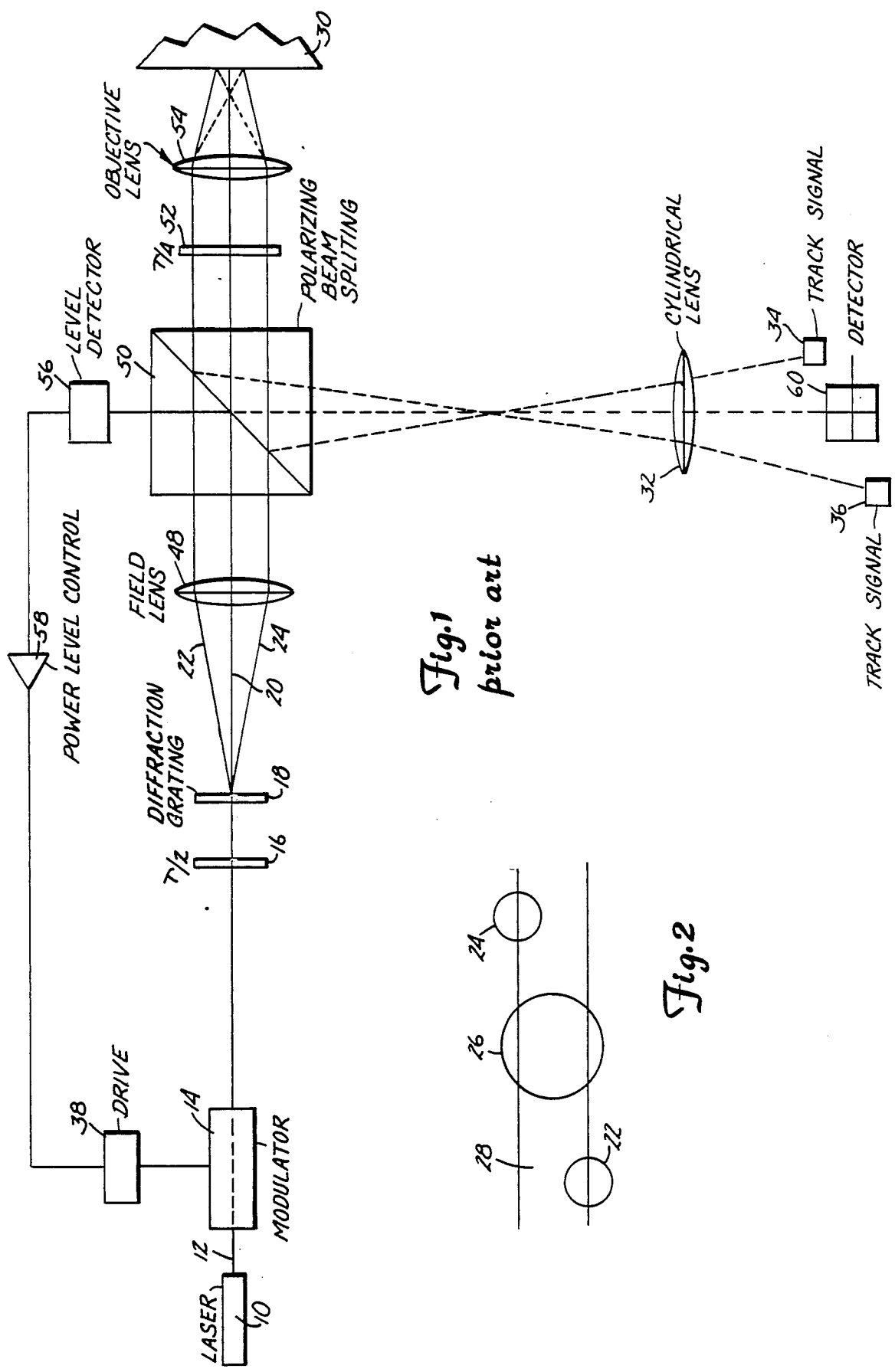

SWITCHING LASER BEAM APPARATUS WITH RECOMBINED BEAM FOR RECORDING

BACKGROUND OF THE INVENTION

1. Field of the Invention

The invention relates to the field of optical recording apparatus and more particularly to lasers for use therein and their associated optics.

2. Brief Description of the Prior Art

The apparatus according to the prior art is shown in FIG. 1. A gas laser 10 projects a beam 12 through acoustic optical modulator 14, a half wave plate 16, a diffraction grating 18, which splits the beam into three beams as better illustrated in FIG. 2 comprised of a central read or write beam 26, a read before write beam 22 and a read after write beam 24. The read or write beam 20 is intended to be centered on a recessed track 28 (FIG. 2) on an optical recording surface 30 while the read before write beam 22 follows the left edge of track 28 and the read after write beam 24 follows the right edge of track 28. Again, referring to FIG. 1, these three beams, after having been diffracted, pass through a field lens 48, a polarizing beam splitter 50, a quarter wave plate 52 and an objective lens 54, which focuses the beams onto the optical recording surface. The beams reflect off the recording surface 30, pass again through the objective lens 54 and the quarter-wave plate 52, are reflected by the polarizing beam splitter toward a cylindrical lens 32 which focuses the respective read before write beams and read after write beams on to track signal detectors 34 and 36, and the main beam on to focusing signal quad detector 60, which also produces the read signal. A portion of the read or write beam 20 is reflected by the polarizing beam splitter into a level detector 56 which provides a feedback through power level control 58 to a drive 38 which in turn controls the power applied to the acoustic optical modulator 14.

Conventionally, the power of the write beam is an order of magnitude greater than the power of the read beam. Typically, therefore, the gas laser 10 is operated at one power level for read operations and a second power level for write operations. This, likewise, causes the read before write and read after write beams 22, 24, derived as they are from the read or write beam 20, to vary in the same ratio of power.

Track signal detectors 34 and 36 operate by discriminating between small changes in reflected intensity as the corresponding beams on track 28 cross a track boundry as shown in FIG. 2. The variations in signal power detected by the track signal detectors 34 and 36 are in turn fed into a servo system (not shown) which maintains the optical system focused on track center.

One can readily see the engineering problem posed by having the read before write and read after write beams 22 and 24 respectively operating at two magnitudes of power an order of magnitude apart, where track signal detectors 34 and 36 are attempting to distinguish between small changes in power. It is the purpose of this invention to overcome this problem.

SUMMARY OF THE INVENTION

The invention comprises switching the write beam out of the optical path taken by the read beam prior to the generation of the read before write and read after write beams. In this manner the read before write and the read after write beams are generated by a diffraction grating from the read beam alone and operate, therefore, at only one power. The track signal detectors may, therefore, be adjusted to detect the reflected read before write and read after write beams at only one power level.

The write beam is deflected from the optical path taken by the read beam by the very acoustic optical modulator present in the prior art apparatus. This deflection is achieved by (1) including in its drive a frequency oscillator coupled to an acoustic transducer of sufficient power to deflect (diffract) substantially all of the light beam at a predetermined angle away from the optical path of the read beam. In the preferred embodiment 95 percent of the power is deflected in the direction of the write beam. However, 5 percent of the power is allowed to remain in the read optical path. In one embodiment a beam stop is included at a small angular deflection from the write optical path. When it is not desired to write information on the optical disk, the frequency input to the acoustic optical modulator is adjusted to deflect the beam a small angle to deflect the write beam into the beam stop. When writing is desired the beam is deflected along the write optical path. Information is written on the optical recording surface by high frequency switching of the beam between the write optical path and the write beam stop.

In an alternative embodiment the write beam is time-shared between the write optical path and the read optical path. 100 percent of the power is deflected into the read optical path when reading is desired. When writing is desired, the beam is deflected along the write optical path. In order to decrease the power along the read optical path to read power levels, an attenuator is incorporated into the read optical path.

As in the conventional embodiment an additional split field (or quad field) detector is incorporated into the observation optics centered between the track signal detectors. Besides the focusing and read operation, this permits observation of the reflected write beam. The split field detector permits fine frequency adjustment of the drive to dynamically adjust the angular direction of the write beam. When a quad detector is used, any offset of the write beam vis-a-vis the read before write and read after write beams can be detected and corrected.

BRIEF DESCRIPTION OF THE DRAWINGS

FIG. 1 shows a schematic of gas laser acoustic optical modulator and associate optics of the prior art apparatus.

FIG. 2 shows a read before write, a read after write and a read or write beam focused on a track on an optical recording surface.

DESCRIPTION OF THE PREFERRED EMBODIMENT

Figure 3:
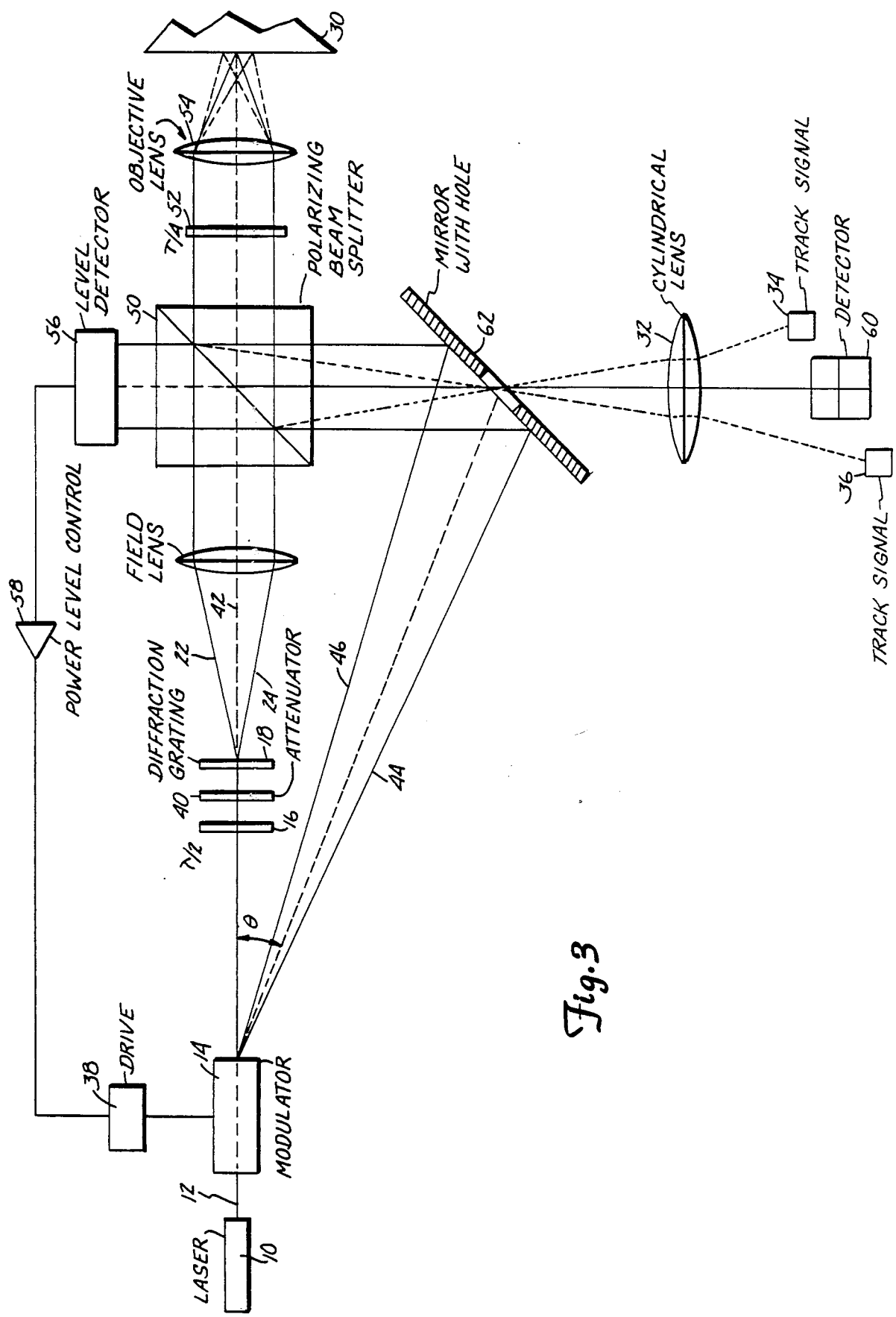
FIG. 3 shows a first embodiment of the switched write beam optics according to the present invention.

FIG. 3 shows a first preferred embodiment of an optical recording apparatus according to the present invention. Many elements of the preferred embodiment are identical to elements found in the prior art apparatus. Among these identical elements are laser 10, modulator 14, half-wave plate 16, diffraction grating 18, field lens 48, polarizing beam splitter 50, quarterwave plate 52, objective lens 54, optical recording surface 30, cylindrical lens 32, track signal detectors 34 and 36, focusing and read signal quad detector 60, level detector 56, power level control 58 and drive 38. Drive 38 performs additional functions from the drive 38 shown in FIG. 1 as will be discussed infra.

Additional elements shown on the figure are a write beam 44 centered on write optical axis 46, a mirror 62 having a central aperture mounted in the write optical path 46 and an attenuator 40 mounted in the read beam optical path 20. The mirror 62 is mounted to intersect the outgoing write beam 44 and reflect it into the polarizing beam splitter 50 such that it is then reflected by the beam splitter through the quarterwave plate 52, objective lens 54 onto the optical recording surface 30 at approximately the same locus as that of the read beam 20. This is equivalent to returning the write beam to the read beam optical path 20 after the read beam has been diffracted into read before write and read after write beams 22 and 24.

Figure 4:
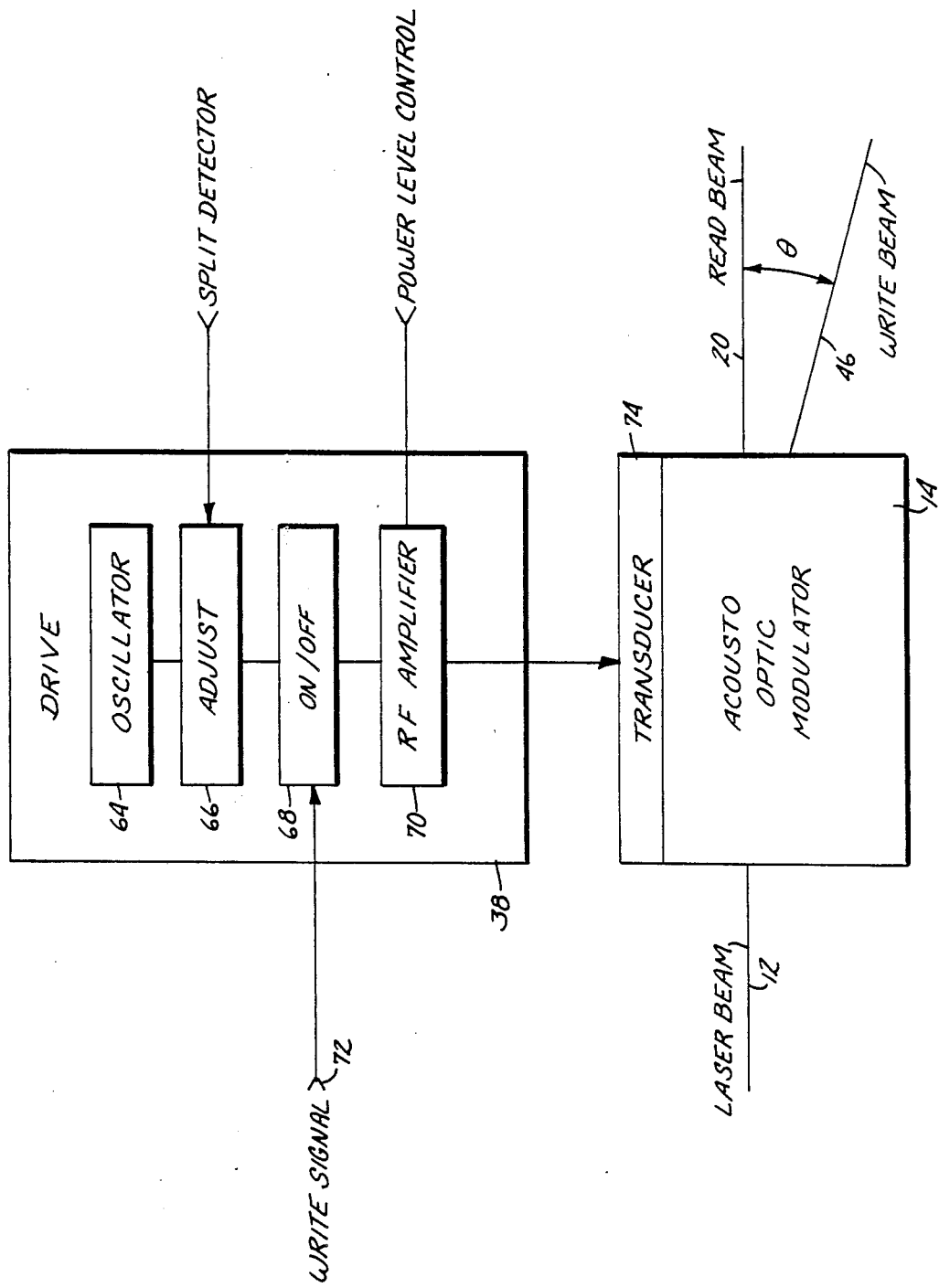
FIG. 4 shows a block schematic of the electronics of the drive of the first embodiment.

Referring to FIG. 4, the drive electronics 38 include a fixed frequency oscillator 64 whose output is adjusted by a fine frequency adjust circuit 66 responsive to a control signal 65 from the split or quad detector 60 shown in FIG. 3. The function of this fine frequency adjust will be discussed momentarily. The output from the adjust circuit 66 feeds into an on/off control circuit 68 which either permits the adjusted oscillator signal to enter an rf amplifier 70 or turn it off entirely. The on/off control circuit 68 is responsive to a write signal 72. Essentially when information is desired to be written on the optical recording surface such as a "hole", the write signal causes the on/off control to pass the adjusted oscillator signal through to the rf amplifier 70. In contrast when no information is desired to be written on the optical surface 30, the write signal causes the on/off control 68 to not pass any oscillator signal onto the rf amplifier. As a result of this latter circumstance, the rf amplifier outputs no signal to the transducer 74 of the acoustic optical modulator 14. With no signal at the transducer 74, the acoustic optical modulator passes the entire laser beam 12 through the modulator 14 along the read beam path 20 at near maximum intensity. When the on/off control 68 passes the adjusted oscillator frequency onto rf amplifier 70, the amplified, oscillator frequency out of the rf amplifier causes the transducer 74 to induce sonic waves in the acoustic optical modulator 14. The interference between the acoustic waves and the laser beam 12 passing through the modulator a portion of the laser beam to be deflected at an angle $\beta$ in so-called Bragg diffraction. The Bragg angle is given by $$\sin \theta = \lambda/2n\, T,$$

where $\lambda$ is the wave length of light in the media, $n$ is the refractive index of the media and T is the wave length of the acoustic waves i.e., $T = v_a/f_a$ where $v_a$ is the velocity of the acoustic waves and $f_a$ is the frequency of the acoustic waves.

Again referring to FIG. 3, when the modulator 14 deflects the write beam along write optical path 46, the beam impinges on mirror 62 which reflects it into the polarizing beam splitter 50, which in turn reflects the write beam through the quarterwave plate 52, objective lens 54 and on to the optical recording surface 30. Until the write beam burns a hole in the media, it reflects back through the objective lens, the quarterwave plate, the polarizing beam splitter 50 and back through the central aperture in mirror 62, through cylindrical lens 32 where it impinges on split or quad detector 60 A quad detector is shown in the figure. The quad detector detects the percentage of the beam lying four respective quadrants and provides feedback signals 65 to the fine frequency adjust to thereby adjust the Bragg angle o of the write beam. It also provides a feedback to a servo system (not shown) to compensate for offset of the focusing of the objective lens. If only a split field rather than a quad field detector is used, only the Bragg adjustment is possible.

Again referring to FIG. 3 when the laser beam is undeflected and travels along the read path 20, as shown in the figure, it passes through half-wave plate 16 and encounters attenuator 40. The attenuator cuts the by an order of magnitude. In the preferred embodiment, the beam power is cut to approximately 5 percent of the original beam power. Thereafter, the "read" beam passes through diffraction grating 18 where it is split into three beams, a read beam 42, a read before write beam 22 and a read after write beam 24, which, after passing through the polarizing beam splitter 50, quarterwave plate 52, and objective lens 54, impinge upon optical surface 30 as is shown in FIG. 2. Thereafter, the beams are reflected back through the objective lens and the quarterwave plate where they are reflected by the polarizing beam splitter downwards in the figure. The dotted lines represent the paths taken by the read before write and read after write signal. The three beams pass through the central aperture of the mirror 60, through cylindrical lens 32 and impinge upon the respective detectors 34, 36 and split field detector 60. The impingement of the read before write and read after write signals on track signal detectors 34 and 36 serve the same servo function as in the prior art but in the preferred embodiment the power level impinging upon these detectors has a maximum predetermined level determined by the maximum power of the laser beam 20 as attenuated by attenuator 40. The quad beam detector, detecting the reflected read signal, provides feedback to the servo system to adjust for the accurate focusing of the objective lens.

Again referring to the write beam 44, when it enters the polarizing beam splitter 50 a percentage of the beam is transmitted directly through the polarizing beam splitter 50 and impinges upon level detector 56. Level detector 56 then provides a feedback signal to power level control 58 which in turn provides a feedback signal 69 to the rf amplifier 70 in drive 38. Likewise, a certain percentage of the read beam 42 is reflected to level detector 56 by polarizing beam splitter 50 and the read power is also dynamically adjusted by power level control 58 providing feedback to rf amplifier 70 in drive 38.

In the above we spoke as if the laser beam were being entirely deflected into the write beam path 46 such that there remained no residual power along the read beam path 20. In practical systems, the percentage of the beam deflected along the first order diffraction path 44 depends upon the amount of power induced into the acoustic optical modulator by transducer 74. The intensity of light in first order diffracton is $$I = I_o \sin^2(\Delta\phi/2),$$

where $I_o$ is the incident intensity and $$\Delta\phi = 2\pi l \Delta n/\lambda,$$

where l is the interaction length, $\lambda$ is the wavelength of the laser light and $$\Delta n = (M_2 10^7 P/2A)^{\frac{1}{2}},$$

where $$M_2 = n^6 p^2 / \rho v_a^3$$

is a figure of merit for the material, p being the component of the photoelastic tensor, $\rho$ the density in grams per cubic centimeters, $v_a$ the acoustic velocity in centimeters per second, n the refractive index of the acoustic medium, P the acoustic power in watts, and A the cross sectional area of the acoustic beam in square centimeters. It can be seen from the above equations that the percentage of beam deflected into the first order Bragg diffraction is depended upon the power of the transducer 74. Thus in the preferred embodiment when we say that the laser beam is deflected along the write path 46, what we are saying is that a certain percentage of the laser beam is deflected along this path while the remainder continues along the read beam optical path 20. The experienced designer, by controlling the attenuator 40 can select the appropriate percentage of laser beam power to be deflected along the write path 46 so as to minimize or maximize the amount of power used either by transducer 74 or the amount of power absorbed in attenuator 40.

Figure 5:
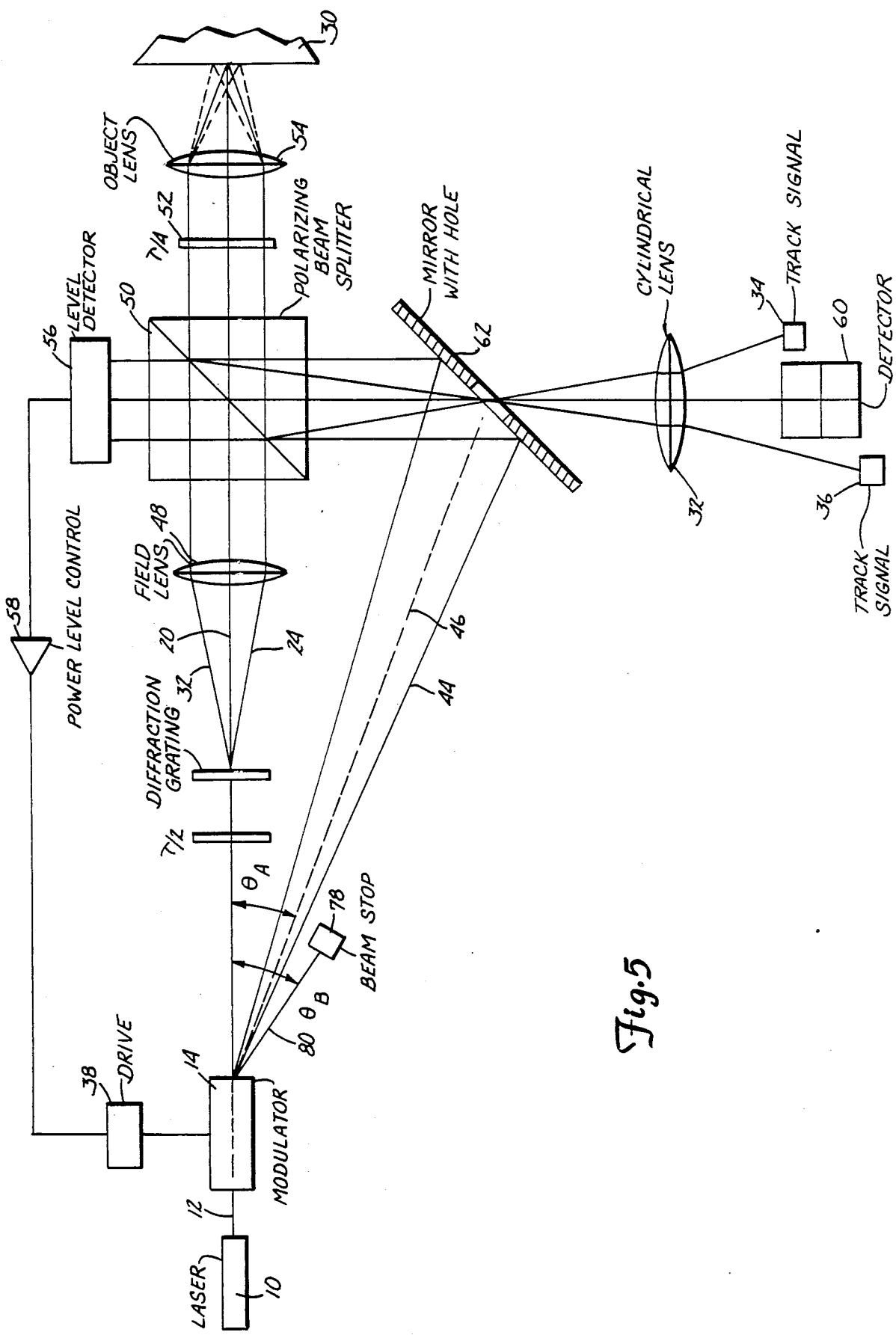
FIG. 5 shows a second embodiment of the switched write beam optics according to the present invention.

FIG. 5 shows a second embodiment of switching laser beam optical recording apparatus according to the present invention. In this embodiment, the attenuator 40 of the first preferred embodiment (see FIG. 3) has been eliminated so that the remaining undeflected read beam 20 is permitted to pass onto the optical recording surface 30 at undiminished power. In this embodiment the write beam is constantly "on", but when it is desired to not write, the write beam is deflected into a beam stop 78. Referring to the figure, the write beam is at various times directed along two optical paths: a first path 46 is directed into mirror 62 and is used when writing data on the optical surface 30; a second path 80 is directed into beam stop 78 and is used when it is not desired to write data on the optical surface 30. Data comprising a series of burned or not burned areas of the optical surface 30 can be written using this apparatus by high frequency switching of the write laser beam between optical paths 46 and 80. The other elements shown in FIG. 5 are the same as those shown in FIG. 3 and will not be discussed further here.

Figure 6:
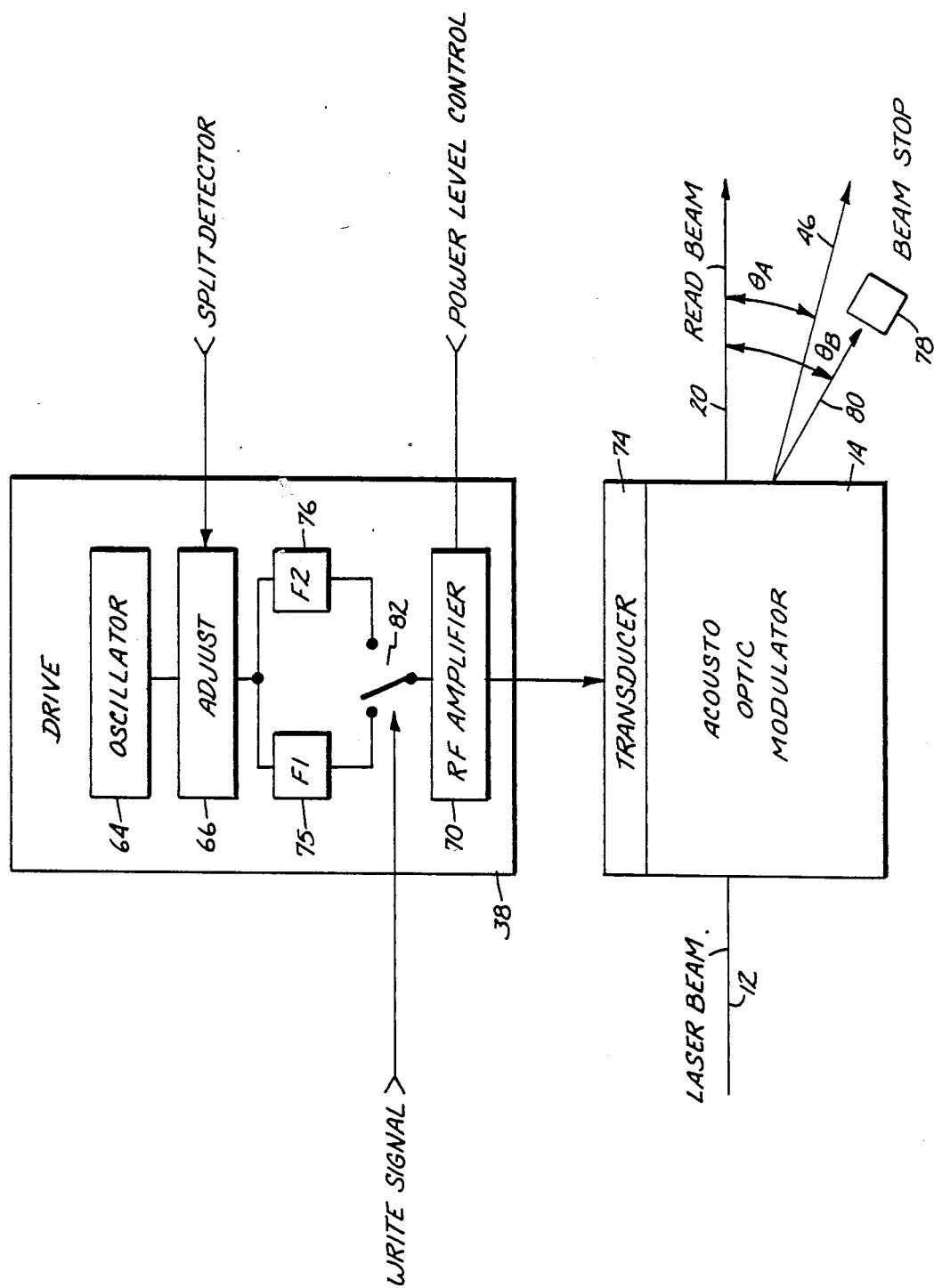
FIG. 6 shows a block schematic of the electronics of the drive of the second embodiment.

FIG. 6 shows the essential components of the drive 38 necessary to achieve the deflection of the write beam along two optical paths 46 and 80. All of the elements shown in the Figure are identical to the elements shown in FIG. 4 with one exception. On/off switch 68, shown in FIG. 4, has been replaced by three elements, namely, the frequency controls 75 and 76, F1 and F2, respectivly, and a switch means 82 for switching the outputs of the frequency controls 75 and 76 into the rf amplifier 70. Switch 82 is responsive to write signal 72. In the preferred embodiment the output of the F1 frequency control 75 causes the acoustic optical modulator 14 to deflect the laser beam by an angle $\theta_a$ along the write optical path 46. The output of the F2 frequency control 76 causes the acoustic optical modulator 14 to deflect the laser beam 12 at an angle $\theta_b$ along the beam stop optical path 80. The actual difference between angles $\theta_a$ and $\theta_b$ need not be very large and in practice should be made small so that the deflection can be made rapidly. Therefore the frequency difference between the outputs of the F1 and F2 frequency controls 75 and 76 are similarly small. Those skilled in the art will appreciate that the frequency out of F2 frequency control 76 is a higher frequency then the frequency out of F1 frequency control 75.

In this embodiment the power at which transducer 74 is operated is sufficient to divert approximately 95 percent of the laser beam's power into the write optical paths beams either 46 or 80. The remaining 5 percent of the power continues along the read beam path 20. As a result, the detectors 34 and 36 detect the read before write and read after write signals at a constant power, far less then the power were the write beam transmitted along the read optical path 20 undiminished in power, thus achieving the purpose of the invention.

The enumeration of the various elements of the preferred embodiment are not to be taken as a limitation on the scope of the appended claims, in which

I claim:

1. Apparatus comprising:
 a laser means for providing a laser beam at a predetermined average power level;
 a write signal having two states, a write state indicating when writing should take place and a read state indicating when only reading should take place;
 a frequency source means responsive to the write signal for selectively providing one of two signals at different frequencies, one in response to the write state, one in response to the read state;
 an rf amplifier means responsive to said one of two signals from said frequency source means for amplifying said one of two signals; and
 an acoustic optical modulator means responsive to the amplified one of two signals placed in the path of said laser beam for diffracting said beam into a zero order beam directed along a read path and a first order beam directed along one of two first order paths depending on which one of said two signals from said frequency source means is selected by said write signal: a write first order path directed toward a reflector means for diverting the first order laser beam back into the read path, and a read-only first order path directed toward a beam stop;
 whereby a laser means operated at a single power level is diverted into a read power zero order directed along a read path and a first order beam, and the further wherein the first order beam is selectively diverted back into the read path in response to a write signal to form a combined write beam.

2. The apparatus of claim 1 further including a diffracting grating means for splitting said laser beam in said read path into read, read before write, and read after write beams, said diffraction grating means mounted between the acoustic optical modulator means and a point where the reflector means diverts the first order beam back into the read path.

* * * * *